(12) United States Patent
Kaneko et al.

(10) Patent No.: US 7,103,875 B1
(45) Date of Patent: Sep. 5, 2006

(54) METHODS AND APPARATUS FOR INTEGRATED, AUTOMATIC PSEUDO LOCALIZATION OF SOFTWARE

(75) Inventors: Atsushi Kaneko, San Rafael, CA (US); Hans E. E. Kedefors, Hillsborough, CA (US)

(73) Assignee: Siebel Systems, Inc., San Mateo, CA (US)

(*) Notice: Subject to any disclaimer, the term of this patent is extended or adjusted under 35 U.S.C. 154(b) by 614 days.

(21) Appl. No.: 09/960,580

(22) Filed: Sep. 21, 2001

(51) Int. Cl.
*G06F 9/44* (2006.01)

(52) U.S. Cl. .................. 717/125; 717/106; 717/123

(58) Field of Classification Search ........ 717/100–131; 715/530–542; 345/703, 714
See application file for complete search history.

(56) References Cited

U.S. PATENT DOCUMENTS

| | | | |
|---|---|---|---|
| 5,664,206 A | 9/1997 | Murow et al. | |
| 5,678,039 A | 10/1997 | Hinks et al. | |
| 5,917,484 A | * 6/1999 | Mullaney | ................. 345/703 |

OTHER PUBLICATIONS

Robinson et al., "New Approaches to Creating and Testing Internationalized Software", CiteSeer, Hewlett-Packard Journal, vol. 50, Article No. 5, pp. 29-36, Nov. 1998.*
Garcia et al., "A Three-layer DSS Based on Multi-Objective Value Analysis for Internationalization of Software Products and Services", IEEE, pp. 62-71, Nov. 1999.*
Kokkotos et al., "An Architecture for Designing Internationalized Software", IEEE, pp. 13-21, 1997.*

* cited by examiner

*Primary Examiner*—Ted T. Vo
(74) *Attorney, Agent, or Firm*—Campbell Stephenson Ascolese LLP

(57) ABSTRACT

Methods and articles of manufacture for integrated, automatic pseudo localization of software applications are disclosed herein. A pseudo localization process, comprised of one or more utility applications, is integrated into a build cycle for a developing software application to generate pseudo-translated user-interface code as part of a build process. A build application may then generate a pseudo-language build of the developing software application and/or development database to enable testing and identification of internationalization defects that would prevent effective localization of the software product for the international market.

40 Claims, 6 Drawing Sheets

US 7,103,875 B1

METHODS AND APPARATUS FOR INTEGRATED, AUTOMATIC PSEUDO LOCALIZATION OF SOFTWARE

TECHNICAL FIELD OF THE INVENTION

This disclosure relates to software development, and more particularly, but not exclusively, to apparatus, methods, and articles of manufacture for pseudo localizing software applications during development through the integration of an automated pseudo localization process into a build environment to facilitate the identification of internationalization development issues.

BACKGROUND INFORMATION

International markets comprise an ever-increasing percentage of revenue for software developers. In an effort to create multiple language-versions of a base software product to satisfy the demands of the international marketplace, developers typically rely on a process known as localization.

Localization generally refers to a process of altering a software application by translating strings, dialogs, messages, and the like, as well as other components of the software application's user-interface, and/or manipulating functions of the application to accommodate a country's languages, conventions, and cultures (collectively, these locale-specific features will be referred to herein as "UI code"). In effect, localization creates a software product with a locale-specific front end or user-interface, while the middle of the software application, which includes the programming code that defines the functionality of the application, remains unchanged.

Localization may be effectuated by maintaining UI code in repositories or files accessible by, but separate from, the functional code of the software application. Various specific language-versions of the software application may then be built, compiling and linking the functional code with the locale-specific translations of the UI code, which would otherwise be displayed on the user-interface in the language, or with the attributes, of the base version of the application (e.g., English/US attributes). For example, one may think of the UI code as a table comprising a number of rows each containing a specific word or UI code attribute, and a number of columns each representing a different language or locale. If the first column contains rows of UI code specific to the base-language version of the software application (e.g., English), other columns may contain Japanese-language specific UI code, or Swedish-language specific UI code corresponding to the base-language word or attribute contained in a given row. At run-time, the functional code accesses the locale-specific UI code as it is needed, to enable a locale-specific user interaction with the software application.

In order for localization to be effective, the software product must be substantially free of internationalization defects ("bugs"), such as hard-coded strings, hard-coded formats, hard-coded references to translations, matching translation requirements, or the like, which will prevent the software application from providing a locale-specific user-interface during run-time. For example, a typical internationalization bug might be a hard-coded string, a data structure that depends on a value embedded in the program code, rather than on a value (such as those words or attributes contained in the language-specific columns of the table described above) that may be input or changed (e.g., via a translation process). Because the value associated with the string is embedded in the program code, it cannot be altered without physically changing the code, and consequently, the generated user-interface cannot be made locale-specific with reference to the locale-specific translations.

Software developers generally strive to identify and fix internationalization bugs during the development of the localized versions of the application in order to reduce or eliminate the necessity to fix problems discovered by consumers of the software product in the future. One way to identify internationalization bugs in the software application is to build and test a language-specific version of the application with translated UI code, and identify problems with the locale-specific user-interface. However, because the locale-specific translation process is typically time-intensive, waiting for actual translations often results in increased costs and extended delays, as developers seek to implement fixes for bugs discovered after the actual translations have been delivered. As a result, developers often rely on a pseudo-translation of the UI code in order to test their developing application, and to facilitate delivery of a final product in a more timely manner. Testing a software application via a pseudo-translation is commonly referred to as pseudo localization.

Pseudo localization refers to a process of simulating localization by altering translatable base-language UI code, by for example, adding prefix characters or the like to all translatable strings in a software product. One may then identify internationalization bugs from those strings that do not appear as pseudo-translated strings in the user-interface of the pseudo-language build of the application. Typical pseudo localization procedures are manually implemented for specific features of an application and generally require a relatively large amount of time and human effort to accomplish the desired objectives.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

Figure 3A:
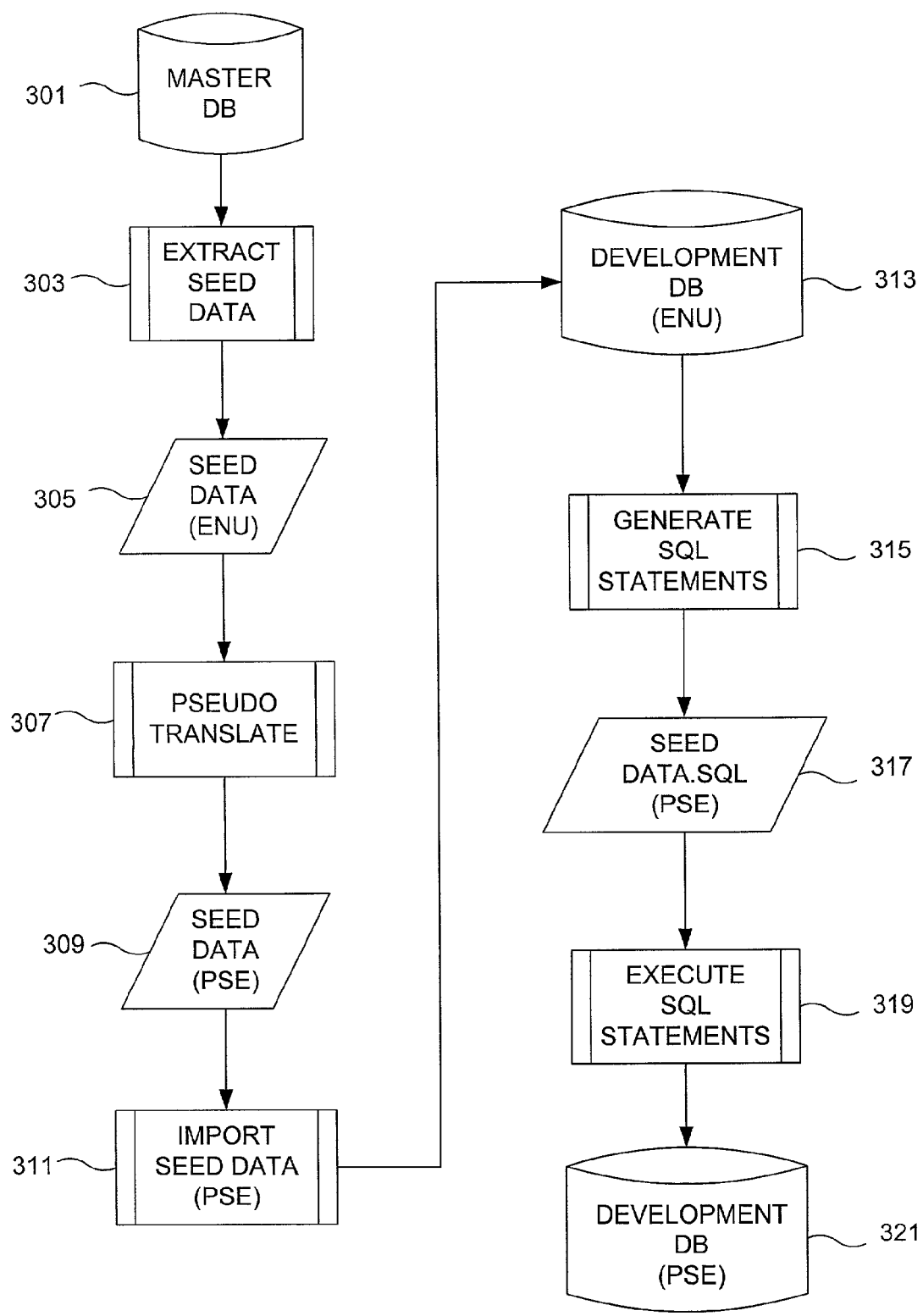
FIG. 3A is a flow diagram illustrating one embodiment of the flow of events from a master database to a pseudo-language development database in a database build process in accordance with the teachings of the present invention.
Figure 3B:
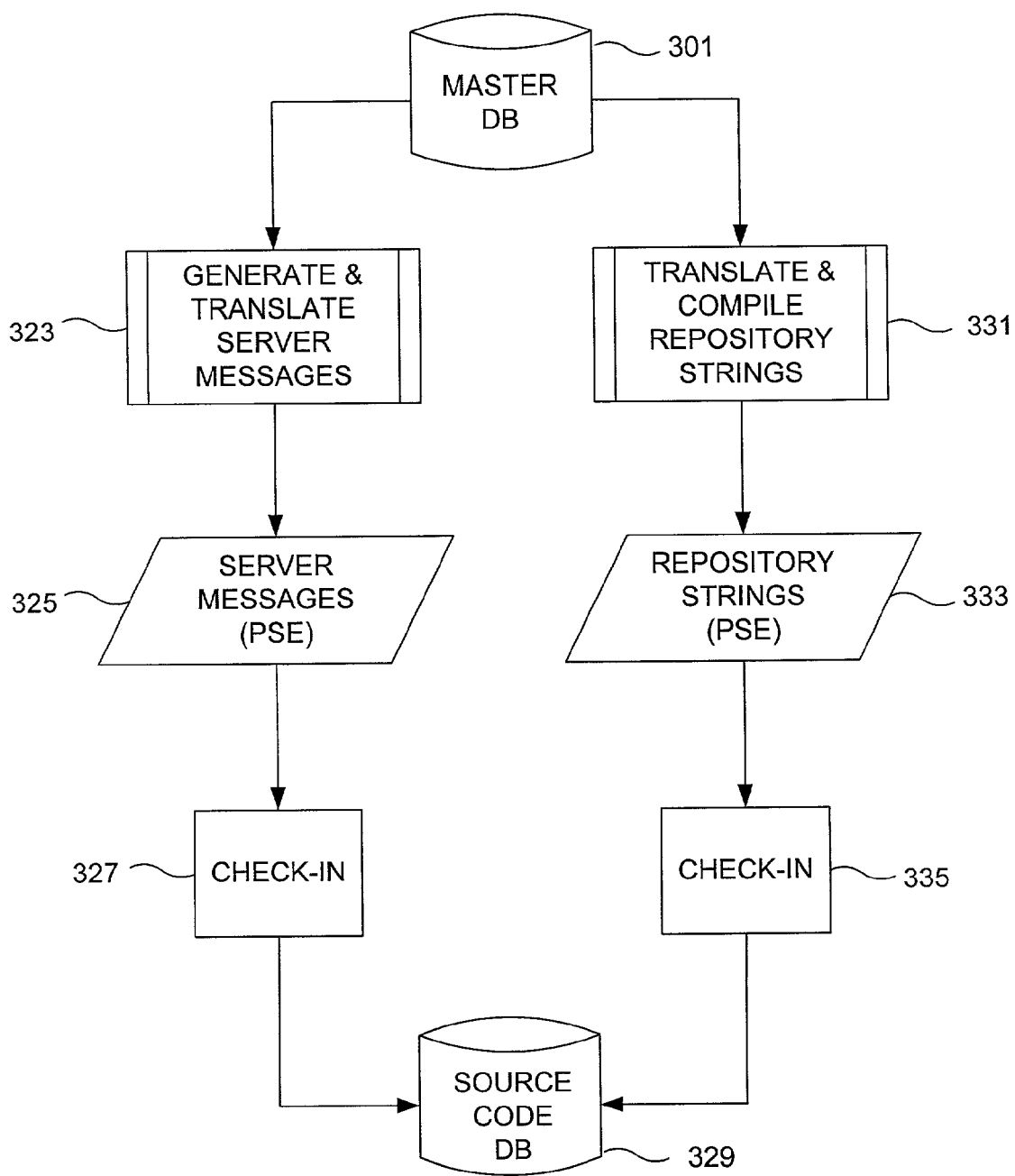
FIG. 3B is a flow diagram illustrating one embodiment of the flow of events from a master database to a source code database in a pseudo-translation process in accordance with the teachings of the present invention.
Figure 3C:
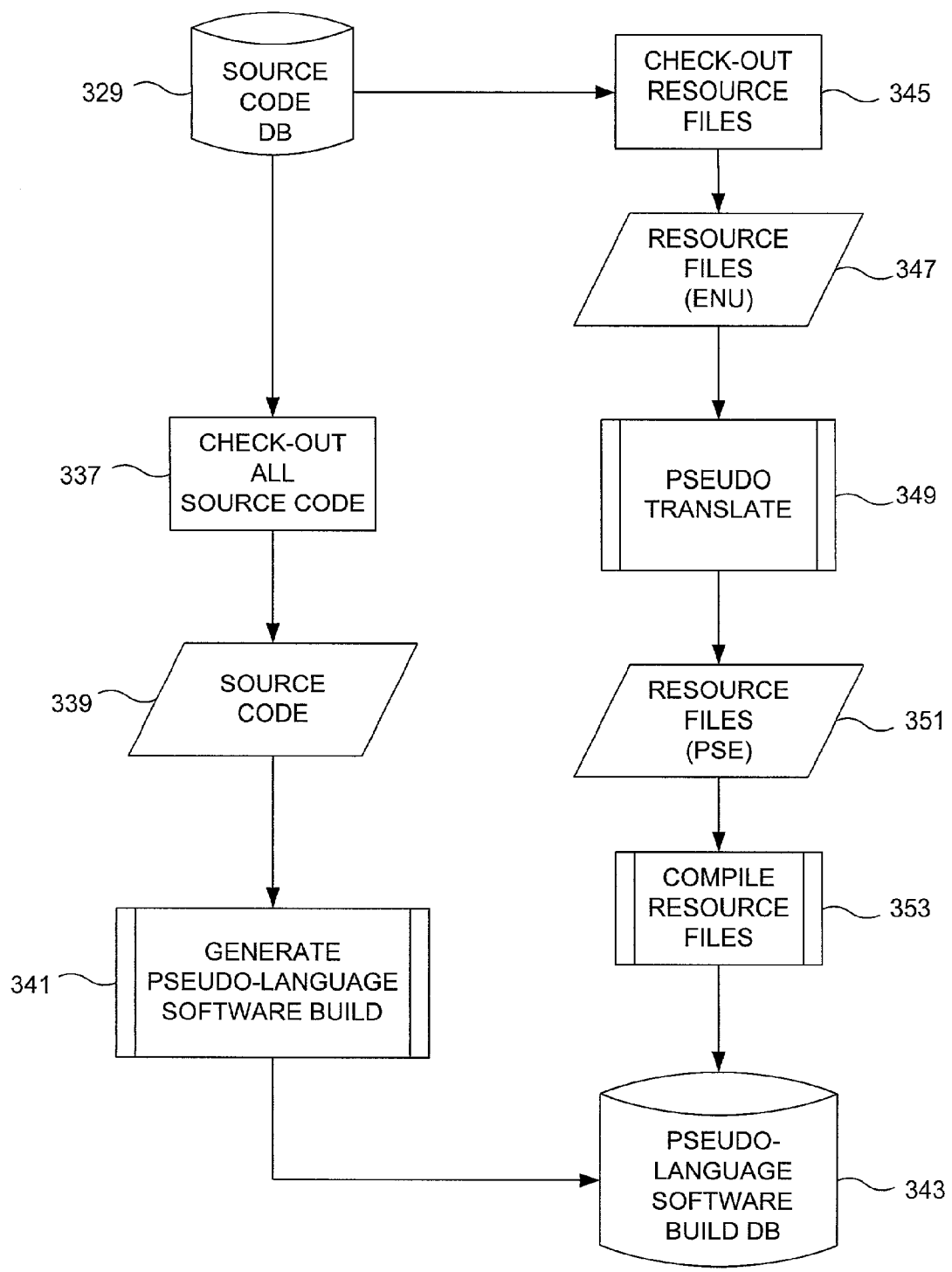
Figure 4:
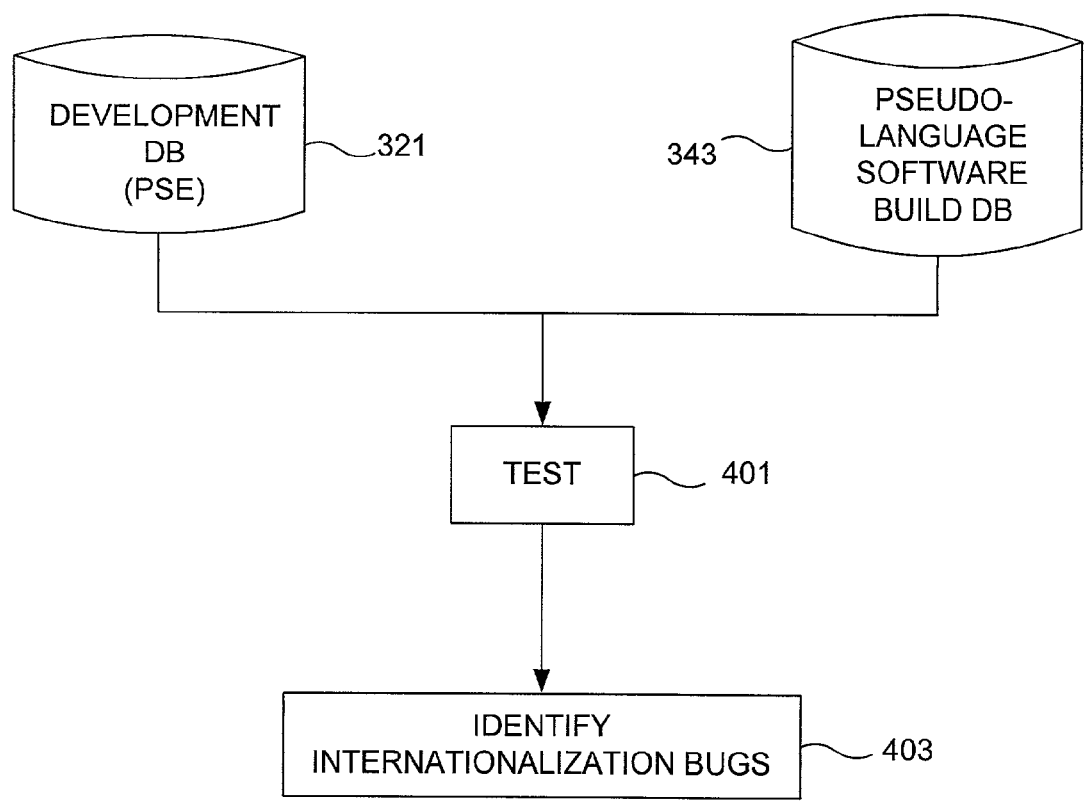

FIG. 3C is a flow diagram illustrating one embodiment of the flow of events from a source code database to a pseudo-language software build database in a software build process in accordance with the teachings of the present invention; and FIG. 4 is a flow diagram illustrating one embodiment of the flow of events in which the software application comprising the pseudo-language development database and the pseudo-language software build are executed in order to test and identify internationalization bugs.

DETAILED DESCRIPTION OF THE ILLUSTRATED EMBODIMENTS

Embodiments of methods, apparatus, and articles of manufacture for the integrated, automatic pseudo localization of software applications are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide for integrating a pseudo localization process into a regular build cycle for a developing software application. The pseudo localization process, in one embodiment, comprises one or more utility applications configured to extract locale-dependant code from a storage location, alter an appearance of the locale-dependant code, and store the altered locale-dependant code in a second storage location such that it may be accessed by a build application to generate a pseudo-language build. Both a pseudo-language database build process and a pseudo-language software build process may incorporate the pseudo localization process to facilitate pseudo-translation of the UI code. The pseudo-language builds may then be utilized for testing the developing software application for internationalization bugs prior to having any true translation of the locale-dependant code available. Any unaltered locale-dependant code that is then discovered in the user-interface may be equated with an internationalization bug that will effectively prevent the localization of the software product unless remedial measures are undertaken. By enabling the discovery of internationalization bugs early on in the software development cycle, higher-quality locale-specific versions of the software product may be produced with greater efficiently, and with less cost to the developer. Other features of the illustrated embodiments will be apparent to the reader from the foregoing and the appended claims, and as the detailed description and discussion is read in conjunction with the accompanying drawings.

Figure 1:
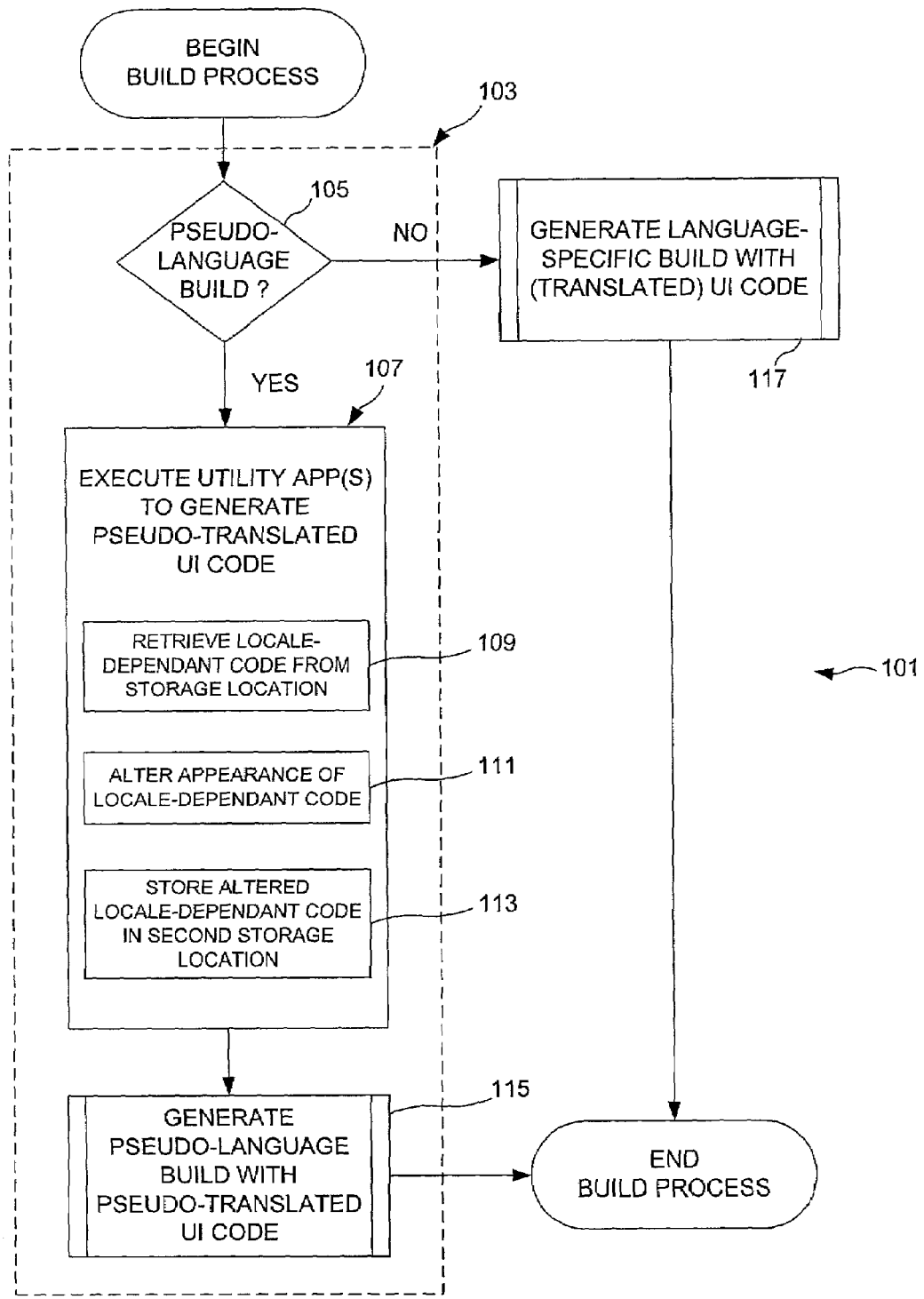
FIG. 1 is a flow diagram illustrating one embodiment of the flow of events in a build process having an automated pseudo localization process integrated therein in accordance with the teachings of the present invention.

Referring now to the drawings, and with reference primarily to FIG. 1, a flow diagram illustrating one embodiment of the flow of events in a build process is shown generally at 101. The build process 101 has an automated pseudo localization process 103 integrated therewith in accordance with the teachings of the present invention. In one embodiment, the build process 101, excepting those features attributable to the integrated pseudo localization process 103, may be a standard build application that compiles a software application's source code into machine-readable binary code, and links various modules of the software application together to generate an installable software product. In another embodiment, the build process 101, excepting those features attributable to the integrated pseudo localization process 103, may be a standard build application that is designed to generate a database (e.g., a development database) of structured query language statements, which may be utilized in conjunction with a software application to enable the software application to function, and/or for testing the software application prior to having actual data available.

In effect, the build process 101, excluding the pseudo-localization process 103, may be designed to generate language-specific builds with existing UI code (see, e.g., process block 117), in an embodiment. In some circumstances, the build process may generate a base-language version (e.g., English) of the software application or database using the UI code. In other circumstances, the build process may generate a language-specific build of the software application or database, for a language other than the base-language (e.g., Japanese, Swedish, etc.) using translated UI code that has been received from translators working in conjunction with the software developers. Ultimately, language-specific builds, generated via the build process 101 (see, e.g., process block 117) are desired for each locale in which the software product may be distributed.

As mentioned previously, in order to effectively and efficiently develop localized versions of the software product for the demands of the international market, the functional code (e.g., the middle of the application) must be substantially free of internationalization bugs, such as hard-coded strings, hard-coded formats, hard-coded references to translations, and the like. Because of the time-intensive nature of the translation aspects of the localization process, it is advantageous to begin testing for internationalization bugs prior to having the actual translations available for language-specific builds.

An aspect of the present invention is the integration of a pseudo localization process 103 into the regular build cycle of the software application or database in order to generate a pseudo-translation of the UI code. The pseudo-translated UI code may then be used as the basis for pseudo-language builds of the software or database to enable testing of the developing application for internationalization bugs. In the embodiment illustrated in FIG. 1, the pseudo localization process 103 begins with a condition to determine whether a pseudo-language build is desired (see, e.g., process block 105). If a build, other than a pseudo-language build is desired, the build process proceeds with a language-specific build as discussed above with reference to process block 117. If a pseudo-language build is desired, the pseudo localization process proceeds with the execution of one or more pseudo localization utility applications to generate the pseudo-translated UI code (see, e.g., process block 107).

The pseudo localization utility application(s) may be configured, in an embodiment, to retrieve locale-dependant code (e.g., UI code) from a storage location (see, e.g., process block 109), such as a master database, a source code database, or other storage location, to alter an appearance of the locale-dependant code (see, e.g., process block 111) in order to make it visibly distinguishable from the base-language UI code, and to store the altered locale-dependant code in a second storage location (see, e.g., process block 113). The second storage location may be the same database, for example, from which the locale-dependant code was originally retrieved, however, the altered locale-dependant code will be stored as a separate file, unique from and distinguishable from the original locale-dependant code (e.g., in a separate physical location within the database). The pseudo localization process 103 ends, as illustrated in the embodiment shown in FIG. 1, with the generation of a pseudo-language build with the pseudo-translated UI code. In practice, the pseudo-language build is effectively no different from any other language-specific build, whether a base-language (e.g., English) build, or a non-base-language (e.g., Swedish, Japanese, Hebrew, German, etc.) build. The pseudo-language build is, instead of being based on an actual translation of the UI code, based on a computer-generated translation, which, in one embodiment, comprises base-language UI code with at least one prefix character added thereto.

Figure 2:
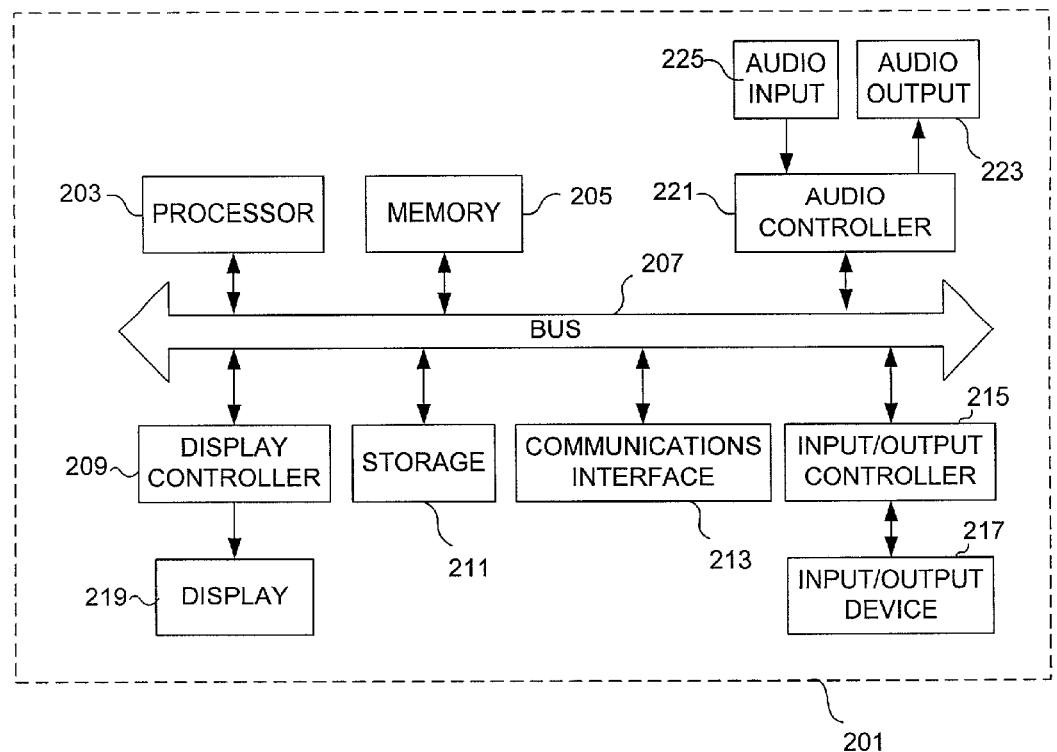
FIG. 2 is a block diagram of one embodiment of a computer system representative of a computer or application server in accordance with the teachings of the present invention.

FIG. 2 is a block diagram illustrating one embodiment of a machine 201 that may be used for execution of the build application and/or the at least one pseudo localization utility application in accordance with the teachings of the present invention. The machine 201 may typically comprise a computer or an application server. In one embodiment, the machine 201 is a computer that includes a processor 203 coupled to a bus 207. In one embodiment, a memory 205, a storage 211, a display controller 209, a communications interface 213, an input/output controller 215, and an audio controller 221 are also coupled to the bus 207.

In one embodiment, the processor 203 may be a conventional processor, such as for example, but not limited to, an Intel x86 processor, or Pentium family microprocessor, a Motorola family microprocessor, or the like. The memory 205 may be a machine-readable medium such as dynamic random access memory ("DRAM"), and may include static random access memory ("SRAM"). The display controller 209 controls, in a conventional manner, a display 219, which in one embodiment may be a cathode ray tube ("CRT"), a liquid crystal display ("LCD"), an active matrix display, a television monitor, or the like. An input/output device 217, coupled to the input/output controller 215 may be a keyboard, a disk drive, a printer, a scanner, or other input/output device, including a television remote, a mouse, a trackball, a trackpad, a joystick, or the like. In one embodiment, the audio controller 221 controls in a conventional manner an audio output 223, which may include for example, audio speakers, headphones, an audio receiver, an amplifier, or the like. In one embodiment, the audio controller 221 also controls, in a conventional manner, an audio input 225, which may include for example, a microphone, or input(s) from an audio or musical device, or the like.

Storage 211, in one embodiment, may include machine-readable media such as for example, but not limited to, a magnetic hard disk, a floppy disk, an optical disk, a read-only memory component ("ROM"), a smart card, or another form of storage for data. In one embodiment, the storage 211 may include removable media, read-only memory, readable/writable memory, or the like. Some of the data may be written by a direct memory access process into the memory 205 during execution of software in the computer system 201. It will be appreciated that software may reside in the storage 211, the memory 205, or may be transmitted or received via a modem or a communications interface 213. For the purpose of the specification, the term "machine-readable medium" shall be taken to include any medium that is capable of storing data, information, or encoding a sequence of instructions or operations for execution by the processor 203 to cause the processor 203 to perform the methodologies of the present invention. The term "machine-readable medium" shall be understood to include, for example, solid-state memories; ROM; random access memory ("RAM"); magnetic disk storage media; optical storage media; flash memory devices; electrical, optical, acoustical or other form of propagated signals (e.g., carrier tones, infrared signals, and digital signals); and the like.

Having observed the general layout and interaction of the integrated pseudo localization process within the main build process, attention may now be given to each individual aspect of the pseudo localization process as it pertains to a software build and/or a database build, and how the pseudo-language builds facilitate the testing and identification of internationalization bugs in the software product.

Effective localization of a software product generally requires that the UI code, with which the user of the software product will interact, be translated into the locale-specific language and/or attributes. Consequently, a pseudo-localization process should also address these same UI code features. The UI code may be broken into any number of categories based on the complexity and type of software product being developed, and/or on the desires of the developers to administer the localization process with independent translators. For example, the UI code may be considered as four separate categories, although others may exist for various software products developed according to the teachings of the present invention). These categories include seed data files, a relatively small set of data including data required to run the software application, and/or sample data (e.g., list of value entries); static UI files, basically comprising resource files including dialogs, bitmaps, icons, menu definitions, some translatable strings, and the like; server messages, such as error messages and the like; and repository strings associated with configurable objects defining an application, such as applet labels (e.g., "First Name"), and the like.

With reference now primarily to FIG. 3A, a flow diagram illustrating one embodiment of the flow of events in a database build process from a master database 301 to a pseudo-language development database 321 is shown in accordance with the teachings of the present invention. A pseudo localization process (see, e.g., block 107, FIG. 1) is integrated with the database build process to facilitate the pseudo-language development database build. The master database 301 includes, in the illustrated embodiment, seed data files that need to be pseudo-translated in order to build the pseudo-language development database 321. As part of the integrated pseudo localization process, seed data is extracted (see, e.g., process block 303) from the master database 301 via a pseudo localization utility application, for example, as described previously in conjunction with FIG. 1 (see, e.g., process block 109). The extracted seed data (see, e.g., process block 305) comprises the base-language seed data (e.g., English ("ENU")).

Following extraction of the base-language seed data 305 from the master database 301, the seed data is pseudo-translated via a second pseudo localization utility application (see, e.g., process block 307) to generate pseudo-language (designated as "PSE") seed data (see, e.g., process block 309) as described previously in conjunction with FIG. 1 (see, e.g., process block 111). In one embodiment, the pseudo-translation of the seed data is intended to alter the appearance of the seed data such that it may be visibly distinguished from the base-language seed data in the user-interface during testing of the pseudo-language build of the software product (e.g., including the software build and the database build). In the illustrated embodiment, the PSE seed data is then imported (see, e.g., process block 311) into a base-language development database 313, as discussed previously in conjunction with FIG. 1 (see, e.g., process block 113).

The remainder of the build process illustrated in FIG. 3A represents the generation of a pseudo-language build of the development database with the pseudo-translated seed data 309 now stored in the base-language development database 313. Initially, structured query language ("SQL") statements are generated (see, e.g., process block 315), and the resulting PSE seed data SQL statements 317 are executed (see, e.g., process block 319) to generate the pseudo-language development database build 321. This database build may then be utilized, in one embodiment, in conjunction with a pseudo-language software build, which will be discussed in greater detail below, to test the software product, and identify internationalization bugs.

It should be noted that although the foregoing description makes reference to a variety of pseudo localization utility applications and other software applications to facilitate the generation of a build, the variety of applications may, in an embodiment, be consolidated into a single application, or any number of applications capable of performing the functions associated therewith. For example, a single pseudo localization utility application may be configured to both extract the base-language seed data, and to pseudo-translate the base-language seed data into the pseudo-language seed data. In still another embodiment, these functions may be performed by separate pseudo localization utility applications.

With reference now primarily to FIG. 3B, a flow diagram illustrating the flow of events in a pseudo-translation process from the master database 301 to a source code database 329 is shown in accordance with the teachings of the present invention. The master database 301 may, in an embodiment, include server messages and repository strings therein that need to be translated in order to generate a pseudo-language build of the software application. Server messages from the master database 301 are generated and translated via a pseudo localization utility application (see, e.g., process block 323), in an embodiment, to generate PSE server messages 325. These PSE server messages are then checked-in to a source code database 329, where they may be stored in a separate pseudo-language directory, for example. The repository strings from the master database 301 are translated and compiled (see, e.g., process block 331), in an embodiment, to generate PSE repository strings 333. These PSE repository strings may then be checked-in to the source code database 329, where they may also be stored in a separate pseudo-language directory, for example.

With reference now primarily to FIG. 3C, a flow diagram illustrating the flow of events in a software build process from the source code database 329 to a pseudo-language software build database 343 is shown in accordance with the teachings of the present invention. The source code database 329, now including the pseudo-language server messages (see, e.g., reference numeral 325) and the pseudo-language repository strings (see, e.g., reference numeral 333) generated by the pseudo localization utility application(s) discussed in conjunction with FIG. 3B, also includes base-language static UI files, such as resource files, which also need to be pseudo-translated in order to generate a pseudo-language build of the software application. The processes illustrated and described in FIGS. 3B and 3C may be combined to form the pseudo-language software build process. The base-language resource files 347 are checked-out (see, e.g., process block 345) of the source code database 329, and pseudo-translated via a pseudo localization utility application (see, e.g., process block 349), in an embodiment, to generate PSE resource files 351. In one embodiment, the PSE resource files 351 are then compiled via another application (see, e.g., process block 353) to generate a portion of the pseudo-language software build, which may be stored in the pseudo-language software build database 343. In addition to the resource files 347, all other source code 339, including the pseudo-translated server messages and the pseudo-translated repository strings are checked-out (see, e.g., process block 337) of the source code database 329 to generate the pseudo-language software build (see, e.g., process block 341), which may be stored in the pseudo-language software build database 343, in an embodiment.

As mentioned previously in conjunction with the pseudo-language development database build illustrated in FIG. 3A, reference to pseudo localization utility applications may refer to individual applications configured to perform the functions described in conjunction therewith, or to applications that consolidate a number of otherwise separate utility applications to perform a plurality of functions described in conjunction therewith. Alteration of the locale-dependant code to generate the pseudo-translations may, in an embodiment, comprise adding at least one prefix character to the base-language locale-dependant code retrieved from a storage location. In one embodiment, the at least one prefix character comprises at least one multi-byte character, such as a Japanese, Korean, Chinese, or other pictorially represented character. In one embodiment, the at least one prefix character comprises at least one right-to-left character, such as a Hebrew or Arabic character, for example, that is traditionally read from right-to-left. In one embodiment, the at least one prefix character comprises a prefix string including at least one multi-byte character and at least one right-to-left character.

In one embodiment of the present invention, the at least one prefix character may be different for each category of the UI code discussed previously, including seed data files, static UI files, server messages, and repository strings. In another embodiment, the at least one prefix character may differ for each new pseudo-language build to distinguish one from the next. It will be appreciated that other types or combinations of characters may also be utilized to create the pseudo-translated UI code without departing from the spirit of the present invention. These characters or combinations of characters need not necessarily be prefix characters. For example, an entire base-language UI code string may be replaced by a pseudo-translation to enable the pseudo-translated UI code to be visibly distinguished from the base-language UI code in the user-interface during testing.

FIG. 4 illustrates a flow diagram showing one embodiment of the flow of events in which the developing software application, comprising the pseudo-language development database 321 and the pseudo-language software build contained in the pseudo-language software build database 343, is executed in order to test (see, e.g., process block 401) the software application and identify any internationalization bugs (see, e.g., process block 403). Reference to a database as used herein is not intended to imply any particular arrangement or type of storage mechanism for data, but is intended only to refer to the storage of a plurality of files in some form of file system.

In one embodiment, when the pseudo-language software build is tested in conjunction with the pseudo-language development database, the user-interface will display the pseudo-translated UI code. If a tester discovers any unaltered UI code in the user-interface, he or she may attribute the unaltered UI code to an internationalization bug, such as a hard-coded string, a hard-coded format, a hard-coded reference to a translation, or the like, that would effectively prevent localization of the software product as to that particular element of UI code. By generating pseudo-language debug builds, a tester may locate and fix these internationalization bugs prior to having the actual translations available for the language-specific builds of the software product, thereby ensuring a higher quality localized product that may be ready for shipment in a more timely manner.

Hard-coded strings and hard-coded formats will be displayed in the user-interface as the base-language UI code (e.g., English), while localizable UI code will be displayed as pseudo-translated UI code, in one embodiment. Hard-coded references to translations may generate errors from the software application, and allow the tester to discover instances in which the code has been written to compare to UI code strings, that may be identical in the base-language version of the application, but may be translated differently in a localized version based on the context in which the UI code string appears in the user-interface. For example, the translation process for actual translations of the UI code may be facilitated by locale-specific individuals located in various parts of the world. Some of the UI code to be translated for a specific locale may be directed to one individual, while another part of the UI code for that specific locale may be directed to another individual who may translate the same string differently than the first individual based on the context in which it appears, or simply as a matter of geographical subtleties in the language or culture. Testing for, and eliminating, hard-coded references to translations permits the software developer to prevent these subtleties from impacting the effective utilization of the localized software product.

Having performed a pseudo localization process also has the advantage of permitting one to determine whether the user-interface has been properly designed to accommodate a variety of string sizes that may be created by different language-versions of the software product, and to determine whether the software application functions properly with multi-byte characters and/or right-to-left characters, which may be encountered during implementation of various language-versions of the software application as well. By including multi-byte characters and/or right-to-left characters in the pseudo-translation, a tester may identify problems associated with a particular font chosen by the software developer's marketing department, for example. If marketing were to choose a font that is not supported for one or more of the language-specific builds that is intended to be prepared, the user-interface will not function properly in that instance. Similarly, if the application is not configured to support a right-to-left mode in the user-interface, those language-specific builds utilizing right-to-left characters will also not be displayed correctly, or at all.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A method, comprising:
   integrating at least one pseudo localization utility application with a build application to provide an integrated build application;
   executing the integrated build application to generate pseudo-translated locale-dependant code, wherein executing the at least one pseudo localization utility application includes:
   (a) retrieving locale-dependant code from at least one storage location;
   (b) altering an appearance of the locale-dependant code; and
   (c) storing the altered locale-dependant code in at least one second storage location; and
   generating a pseudo-language build with the pseudo-translated locale-dependant code.

2. The method of claim 1, further comprising:
   testing the pseudo-language build; and
   identifying at least one internationalization bug.

3. The method of claim 2, wherein the internationalization bug comprises a hard-coded string, a hard-coded format, or a hard-coded reference to a translation.

4. The method of claim 2, wherein identifying the at least one internationalization bug comprises discovering unaltered locale-dependant code in the user-interface.

5. The method of claim 1, wherein altering the appearance of the locale-dependant code comprises adding at least one prefix character to the locale-dependant code.

6. The method of claim 5, wherein the at least one prefix character comprises at least one multi-byte character.

7. The method of claim 5, wherein the at least one prefix character comprises at least one right-to-left character.

8. The method of claim 5, wherein the at least one prefix character comprises a prefix string including at least one multi-byte character and at least one right-to-left character.

9. The method of claim 1, wherein the at least one pseudo localization utility application comprises at least one server message specific utility, and the locale-dependant code comprises at least one server message.

10. The method of claim 1, wherein the at least one pseudo localization utility application comprises at least one repository string specific utility, and the locale-dependant code comprises at least one repository string.

11. The method of claim 1, wherein the at least one pseudo localization utility application comprises at least one resource file specific utility, and the locale-dependant code comprises at least one resource file.

12. The method of claim 1, wherein the at least one pseudo localization utility application comprises at least one utility application capable of retrieving or altering at least one element of user-interface code of a type selected from a group, including: a server message, a repository string, a static UI file, and a seed data file.

13. The method of claim 1, wherein the build application comprises a database build application, the at least one pseudo localization utility application comprises at least one seed data file specific utility, and the locale-dependant code comprises at least one seed data file.

14. The method of claim 1, wherein the build application comprises a software build application.

15. The method of claim 1, wherein said executing the at least one pseudo localization utility application is in response to a determination in the build application to build a pseudo-language build.

16. An article of manufacture, comprising:
a machine-readable storage medium to store instructions, which, when executed by a processing system, cause the processing system to:
implement at least one pseudo localization utility application integrated with a build application to provide an integrated build application;
execute the integrated build application to generate pseudo-translated locale-dependant code through
(a) retrieving locale-dependant code from at least one storage location,
(b) altering an appearance of the locale-dependant code, and
(c) storing the altered locale-dependant code in at least one second storage location; and
generate a pseudo-language build with the pseudo-translated locale-dependant code.

17. The article of manufacture of claim 16, wherein the machine-readable medium further includes instructions, which, when executed by a machine, cause the machine to:
test the pseudo-language build; and
identify at least one internationalization bug.

18. The article of manufacture of claim 17, wherein the internationalization bug comprises a hard-coded string, a hard-coded format, or a hard-coded reference to a translation.

19. The article of manufacture of claim 17, wherein identifying the at least one internationalization bug comprises discovering unaltered locale-dependant code in the user-interface.

20. The article of manufacture of claim 16, wherein altering the appearance of the locale-dependant code comprises adding at least one prefix character to the locale-dependant code.

21. The article of manufacture of claim 20, wherein the at least one prefix character comprises at least one multi-byte character.

22. The article of manufacture of claim 20, wherein the at least one prefix character comprises at least one right-to-left character.

23. The article of manufacture of claim 20, wherein the at least one prefix character comprises a prefix string including at least one multi-byte character and at least one right-to-left character.

24. The article of manufacture of claim 16, wherein the at least one pseudo localization utility application comprises at least one server message specific utility, and the locale-dependant code comprises at least one server message.

25. The article of manufacture of claim 16, wherein the at least one pseudo localization utility application comprises at least one repository string specific utility, and the locale-dependant code comprises at least one repository string.

26. The article of manufacture of claim 16, wherein the at least one pseudo localization utility application comprises at least one resource file specific utility, and the locale-dependant code comprises at least one resource file.

27. The article of manufacture of claim 16, wherein the at least one pseudo localization utility application comprises at least one utility application capable of retrieving or altering at least one element of user-interface code of a type selected from a group, including: a server message, a repository string, a static UI file, and a seed data file.

28. The article of manufacture of claim 16, wherein the build application comprises a database build application, the at least one pseudo localization utility application comprises at least one seed data file specific utility, and the locale-dependant code comprises at least one seed data file.

29. The article of manufacture of claim 16, wherein the build application comprises a software build application.

30. A system, comprising:
computer system having a processor, a memory, and an input/output device;
an executable build application, stored in the memory of the computer system, and configured, when executed by the processor, to generate a language-specific build; and
at least one executable pseudo localization utility application, stored in the memory of the computer system, and integrated with the build application to generate a pseudo-language, language-specific build, the at least one executable pseudo localization utility application integrated with the build application, when executed by the processor, to retrieve locale-dependant code from at least one storage location, to alter an appearance of the locale-dependant code, and to store the altered locale-dependant code in at least one second storage location.

31. The system of claim 30, wherein altering the appearance of the locale-dependant code comprises adding at least one prefix character to the locale-dependant code.

32. The system of claim 31, wherein the at least one prefix character comprises at least one multi-byte character.

33. The system of claim 31, wherein the at least one prefix character comprises at least one right-to-left character.

34. The system of claim 31, wherein the at least one prefix character comprises a prefix string including at least one multi-byte character and at least one right-to-left character.

35. The system of claim 30, wherein the at least one pseudo localization utility application comprises at least one server message specific utility, and the locale-dependant code comprises at least one server message.

36. The system of claim 30, wherein the at least one pseudo localization utility application comprises at least one repository string specific utility, and the locale-dependant code comprises at least one repository string.

37. The system of claim 30, wherein the at least one pseudo localization utility application comprises at least one resource file specific utility, and the locale-dependant code comprises at least one resource file.

38. The system of claim 30, wherein the at least one pseudo localization utility application comprises at least one utility application capable of retrieving or altering at least one element of user-interface code of a type selected from a group, including: a server message, a repository string, a static UI file, and a seed data file.

39. The system of claim 30, wherein the build application comprises a database build application, the at least one pseudo localization utility application comprises at least one seed data file specific utility, and the locale-dependent code comprises at least one seed data file.

40. The system of claim 30, wherein the build application comprises a software build application.

* * * * *